(12) United States Patent
Anspaugh et al.

(10) Patent No.: US 9,393,986 B1
(45) Date of Patent: Jul. 19, 2016

(54) STEERING COLUMN CLAMP MECHANISM

(71) Applicant: STEERING SOLUTIONS IP HOLDING CORPORATION, Saginaw, MI (US)

(72) Inventors: Michael P. Anspaugh, Bay City, MI (US); James C. Russell, Fairgrove, MI (US); Malgorzata R. Szeliga, Bay City, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 3 days.

(21) Appl. No.: 14/608,316

(22) Filed: Jan. 29, 2015

(51) Int. Cl.
*B62D 1/184* (2006.01)
*B62D 1/189* (2006.01)

(52) U.S. Cl.
CPC ................ *B62D 1/184* (2013.01); *B62D 1/189* (2013.01)

(58) Field of Classification Search
CPC .............................. B62D 1/184; B62D 1/189
USPC ............................................. 280/775; 74/493
See application file for complete search history.

(56) References Cited

U.S. PATENT DOCUMENTS

| 8,888,131 | B2* | 11/2014 | Anspaugh | B62D 1/184 280/775 |
| 2009/0229399 | A1* | 9/2009 | Ozsoylu | B62D 1/184 74/493 |
| 2014/0260763 | A1* | 9/2014 | Buzzard | B62D 1/184 74/493 |
| 2015/0090068 | A1* | 4/2015 | Anspaugh | B62D 1/184 74/493 |

* cited by examiner

*Primary Examiner* — Ruth Ilan
(74) *Attorney, Agent, or Firm* — Cantor Colburn LLP

(57) ABSTRACT

A clamping mechanism for a steering column assembly includes an outboard cam configured to rotate about an axis between a first position and a second position, an inboard cam having a travel limiter portion configured to limit rotation of the outboard cam about the axis between the first position and the second position, and an intermediate stop disposed along a portion of the travel limiter portion. At least a portion of the outboard cam is shifted to a position adjacent the intermediate stop during an impact event of the steering column assembly, the intermediate stop preventing movement of the outboard cam from the first position to the second position.

20 Claims, 6 Drawing Sheets

STEERING COLUMN CLAMP MECHANISM

FIELD OF THE INVENTION

The following description relates to steering columns for motor vehicles and, more specifically, to a clamping mechanism lock for a steering column.

BACKGROUND

Some known steering columns for motor vehicles are provided with mechanisms for adjusting the steering column position by an operator of the motor vehicle. Available adjustments typically include a telescoping adjustment in which the steering column is extended toward the operator or retracted away from the operator, and a tilt or rake adjustment in which an angular position of the steering column is changed relative to the operator.

In some known systems, rake is adjusted by releasing an adjustment lever from a secured position, which then allows for rotation of the steering column about a pivot, typically located at an end of the steering column opposite that of the of the steering wheel. Returning the adjustment lever to the secured position retains the steering column in a desired set position about the pivot.

However, some traditional locks for steering columns may provide inadequate load handling capabilities for preventing steering column displacements in the event of a vehicle collision. For example, some known systems may allow unlocking direction motion of a steering column clamp mechanism during or after a crash event. Various conditions may cause or allow rotation of the clamp mechanism such as contact with moving and/or deformed components (e.g., shrouds and closeouts), reduced clamp tension in post-crash positions, inertial loading, and post-crash settling of components.

Accordingly, it is desirable to provide a steering column clamp mechanism to prevent unlock direction motion during a collapse event and to prevent damage induced by excessive impact loading.

SUMMARY OF THE INVENTION

In one exemplary embodiment of the present invention, a clamping mechanism for a steering column assembly is provided. The clamping mechanism includes an outboard cam configured to rotate about an axis between a first position and a second position, an inboard cam having a travel limiter portion configured to limit rotation of the outboard cam about the axis between the first position and the second position, and an intermediate stop disposed along a portion of the travel limiter portion. At least a portion of the outboard cam is shifted to a position adjacent the intermediate stop during an impact event of the steering column assembly, the intermediate stop preventing movement of the outboard cam from the first position to the second position.

In another exemplary embodiment of the present invention, a steering column assembly is provided. The steering column assembly includes a steering column, a rake bracket coupled to the steering column, and a clamping mechanism configured to selectively enable raking movement of the steering column relative to the rake bracket. The clamping mechanism includes an outboard cam configured to rotate about an axis between a first position and a second position, an inboard cam having a travel limiter portion configured to limit rotation of the outboard cam about the axis between the first position and the second position, and an intermediate stop disposed along a portion of the travel limiter portion. At least a portion of the outboard cam is shifted to a position adjacent the intermediate stop during an impact event of the steering column assembly, the intermediate stop preventing movement of the outboard cam from the first position to the second position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
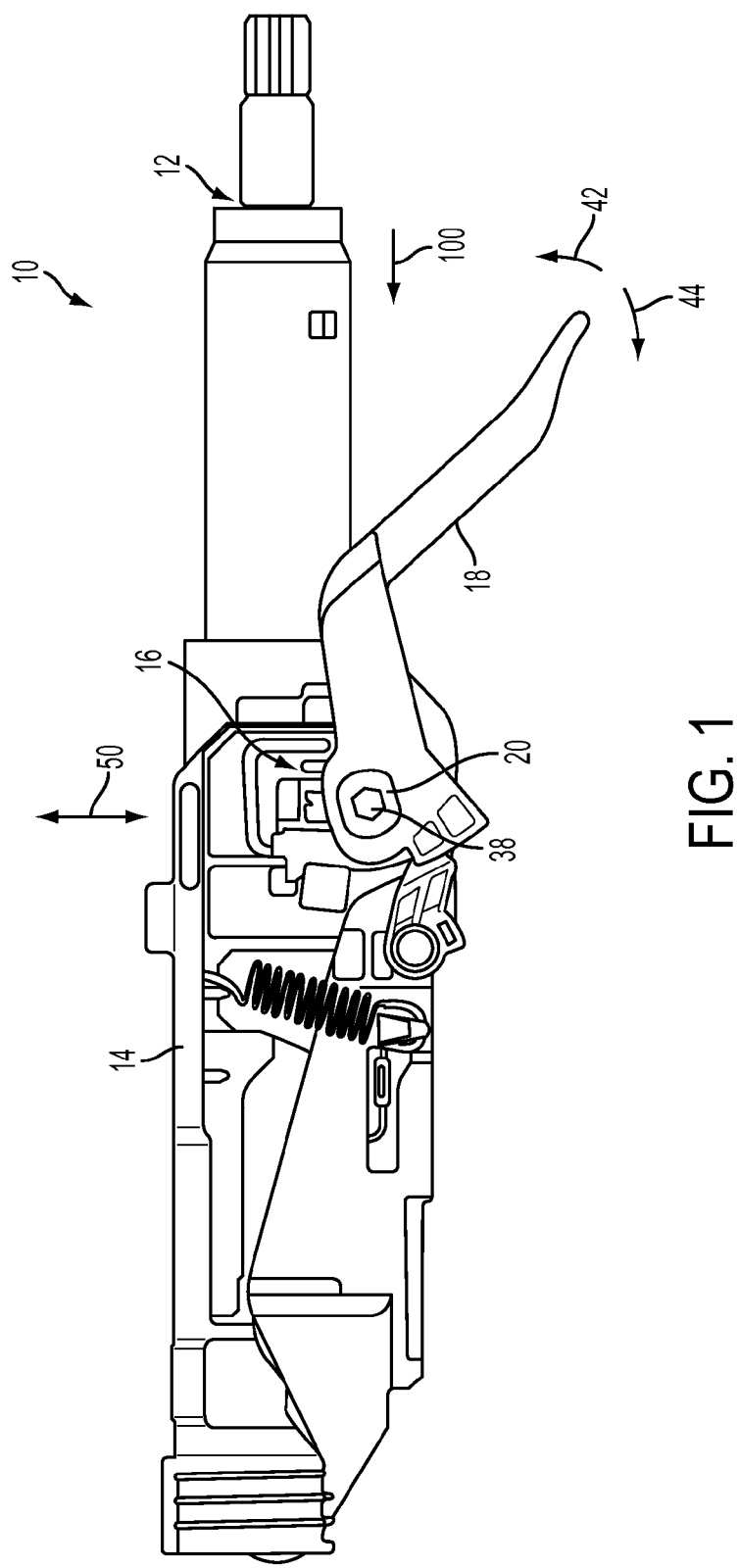
FIG. 1 is a side view of an exemplary steering column assembly.
Figure 2:
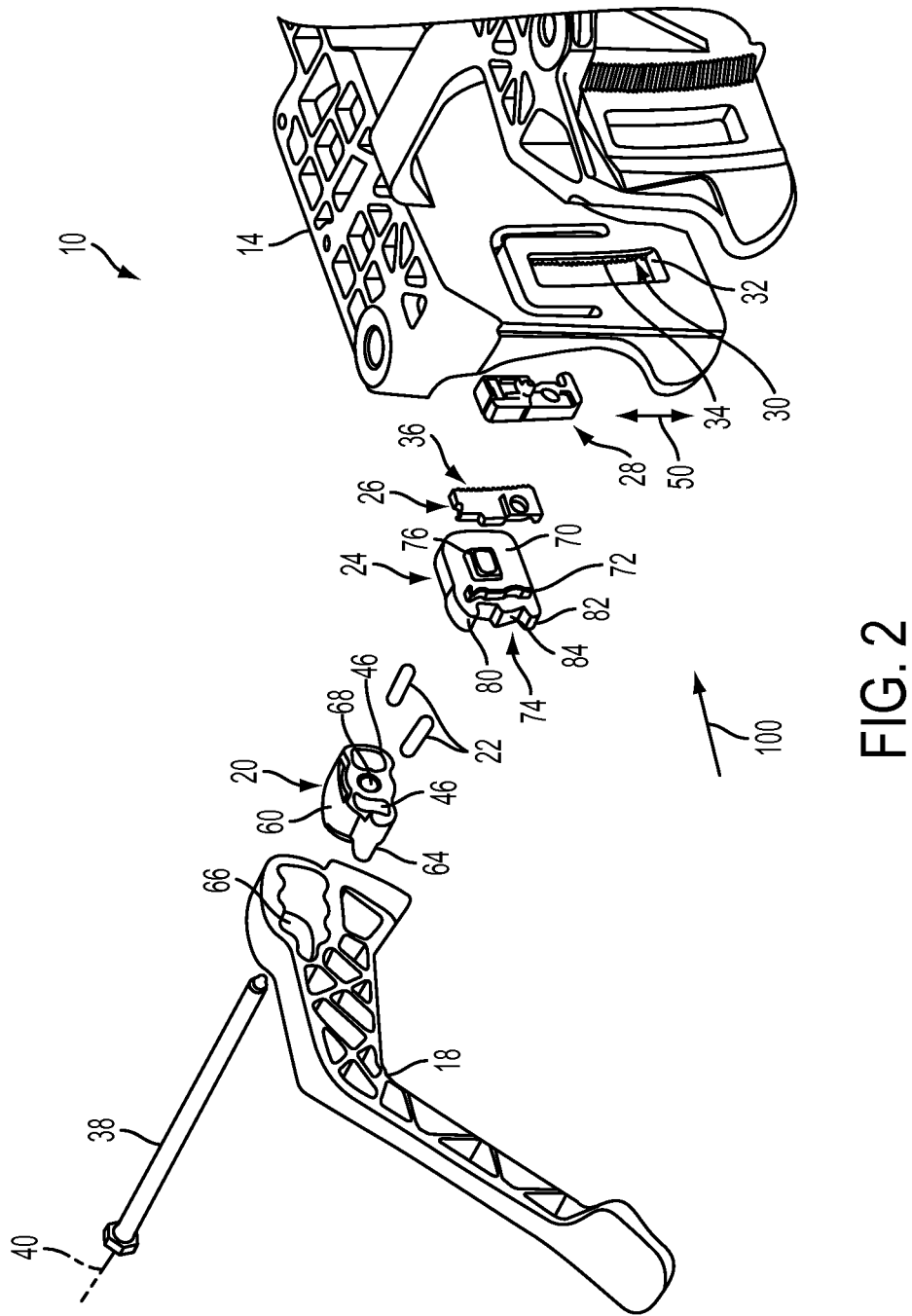
FIG. 2 is an exploded view of a portion of the steering column assembly shown in FIG. 1.
Figure 3:
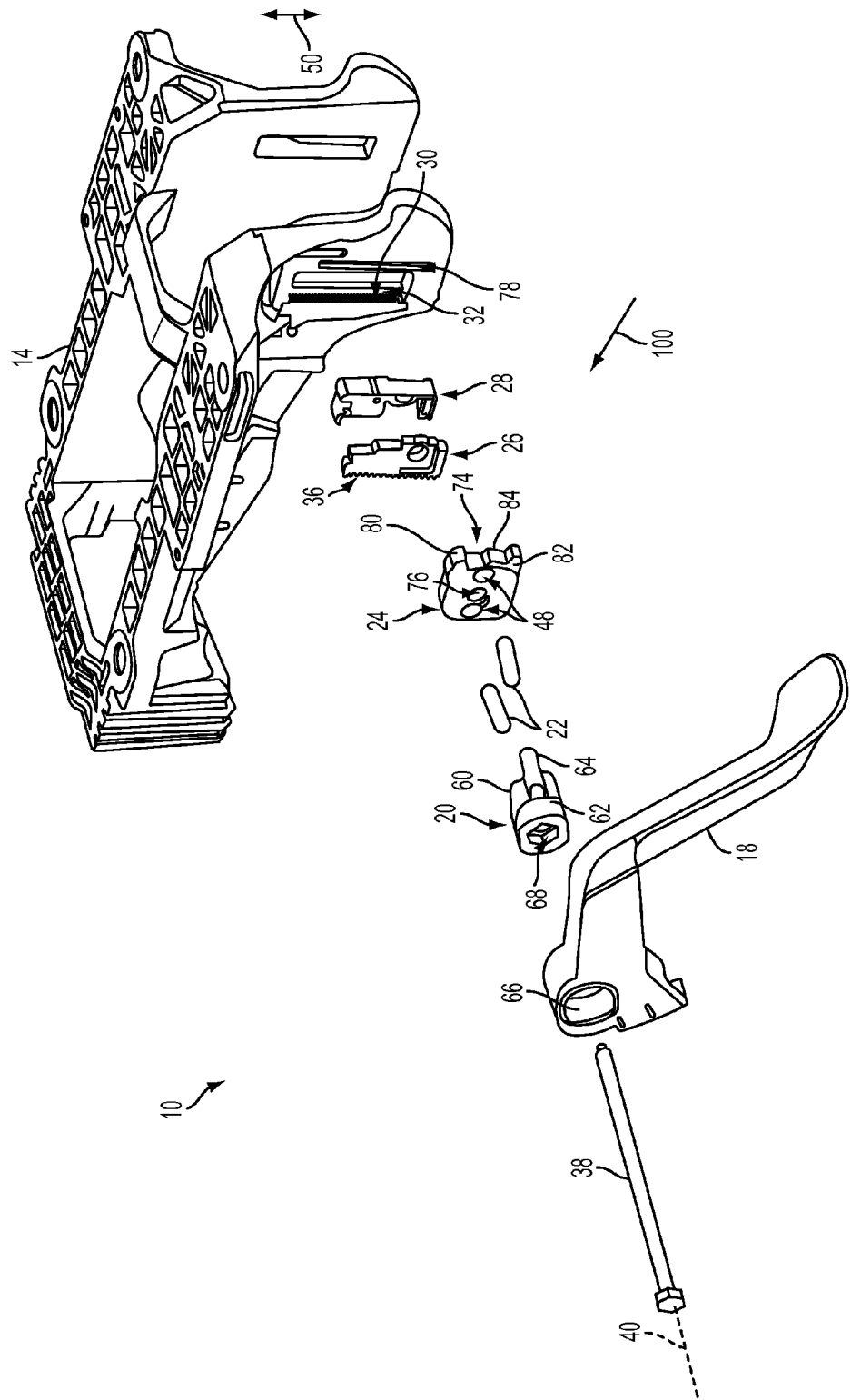
FIG. 3 is another exploded view of a portion of the steering column assembly shown in FIG. 1.

Referring now to the Figures, where the invention will be described with reference to specific embodiments, without limiting same, FIGS. 1-3 illustrate an exemplary steering column assembly 10. As shown in FIG. 1, an exemplary steering column assembly 10 of a vehicle (not shown) generally includes a steering column 12, a mounting or rake bracket 14, a locking or clamping mechanism 16, and a lever or lock arm 18.

Steering column lock arm 18 is utilized to selectively resist or facilitate raking movement of a steering column 12 within an adjustment range defined by clamping mechanism 16. When steering column lock arm 18 is positioned so as to place clamping mechanism 16 in a locking mode (FIGS. 1 and 5), steering column 12 is inhibited from being adjusted. Accordingly, steering column 12 is relatively fixed, positionally, with respect to the vehicle. When steering column lock arm 18 is positioned so as to place clamping mechanism 16 in an adjustment mode (FIG. 4), adjustments to the positioning of steering column 12 are facilitated. Accordingly, steering column 12 may be positionally adjusted relative to the vehicle. Once steering column 12 occupies a desirable position, steering column lock arm 18 may be re-positioned so as to return clamping mechanism 16 to the locking mode.

In an exemplary embodiment, clamping mechanism 16 generally includes a stack-up beginning at the outermost portion of clamping mechanism 16 from steering column 12. It includes an outboard cam 20, one or more pins 22, an inboard cam 24, a locking tooth 26, and a lock tooth bracket 28. Clamping mechanism 16 is configured for selectively resisting or facilitating raking adjustment of steering column 12 and is operably associated with rake bracket 14. In an exemplary embodiment, rake bracket 14 is fixed to a structure of the vehicle (not shown) and disposed adjacent to steering column 12.

As shown in FIGS. 2 and 3, rake bracket 14 includes a rake lock tooth wall 30 that bounds a control slot 32 and that defines a plurality of rake lock teeth 34. The rake lock tooth wall 30 with its plurality of rake lock teeth 34 provides a stationary structure against which a cooperating member (e.g., locking tooth 26 having teeth 36) may be engaged so as to lock the cooperating member to the stationary structure. It should be appreciated that locking surface features other than teeth (e.g., a rough or tacky surface) may be employed so as to provide a stationary structure against which a cooperating member may be engaged so as to lock the cooperating member to the stationary structure. Alternatively, assembly 10 may not include rake lock features 26, 30, 34, and/or 36.

A rake bolt 38 extends through lock arm 18, clamping mechanism 16, and rake bracket 14 and is configured for rotation about an axis 40. Steering column lock arm 18 is coupled to rake bolt 38 through outboard cam 20 such that steering column lock arm 18 facilitates application of a torque upon rake bolt 38 in either a locking direction 42 or an adjustment direction 44 (see FIG. 1).

In an exemplary embodiment, outboard cam 20 operates in conjunction with the steering column lock arm 18 so as to limit the absolute range of rotation of rake bolt 38 so as to prevent application of excessive loads upon tooth lock 26 or other components of clamping mechanism 16.

Inboard cam 24 may be utilized in connection with outboard cam 20 selectively clamp or lock steering column 12 to prevent raking movement. For example, one or more pins 22 may be pressed into a ramped slot 46 formed in outboard cam 20, and pins 22 may then extend through a slot 48 formed in inboard cam 24. As illustrated, as lock arm 18 rotates in the adjustment directions 42, 44, pins 22 move along ramped slot 46 to move outboard cam 20 toward or away from inboard cam 24. As such, in the unlocked position, pins 22 are oriented generally parallel to rotation axis 40 and outboard cam 20 is spaced apart from inboard cam 24. As lock arm 18 is rotated to the locked position, pins 22 are angled relative to rotation axis 40 and outboard cam 20 is pressed or clamped against inboard cam 24 and rake bracket 14 to facilitate preventing raking movement of steering column 12 relative thereto.

In addition, inboard cam 24 may be used along with rake bracket 14 to define the range of translational motion of rake bolt 38 and tooth lock 26. The tooth lock 26 is configured for selectively engaging and disengaging from the rake lock tooth wall 30 and the plurality of rake lock teeth 34, in response to forward movement or shuttling of rake bolt 38, so as to selectively resist or enable translation of tooth lock 26 in a raking direction 50.

In an exemplary embodiment, rake bolt 38 is translationally fixed to steering column 12, inboard cam 24, and tooth lock 26 such that when steering column 12 undergoes raking movement, rake bolt 38, inboard cam 24, and tooth lock 26 also undergo raking movement. Accordingly, when tooth lock 26 is prevented from undergoing raking movement, rake bolt 38, inboard cam 24, and steering column 12 are also prevented from undergoing raking movement.

Figures 4, 5:
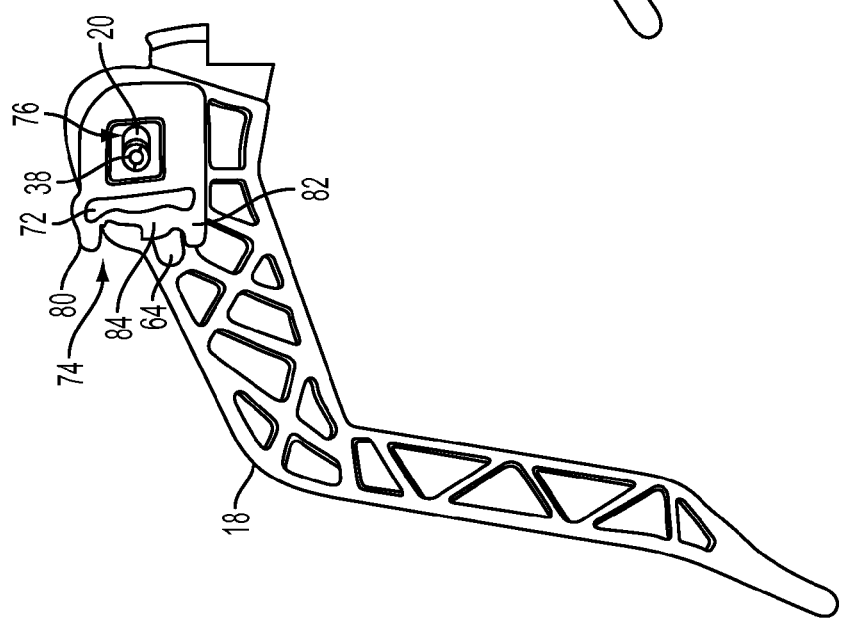
FIG. 4 is a side view of a clamping mechanism of the steering column assembly shown in FIG. 1 in an unlocked position.
FIG. 5 is a side view of the clamping mechanism shown in FIG. 4 in a locked position.
Figure 6:
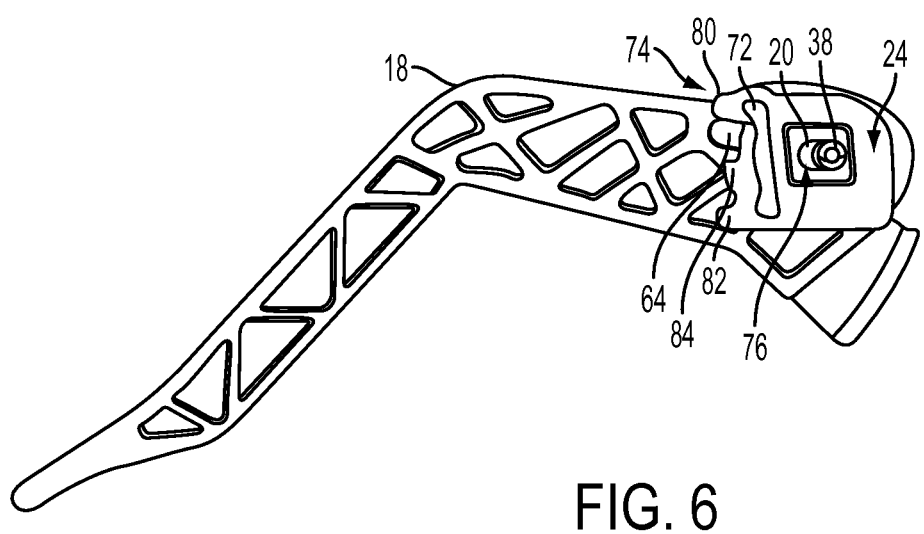
FIG. 6 is a side view of the clamping mechanism shown in FIG. 4 in a post-impact event position.

FIGS. 4-6 illustrate the locking movement of clamping mechanism 16, which facilitates selective locking of steering column 12 and preventing unlocking motion of lock arm 18 during/after a crash event. Specifically, FIG. 4 illustrates lock arm 18 and clamping mechanism 16 in an unlocked position, FIG. 5 illustrates lock arm 18 and clamping mechanism 16 in a locked position, and FIG. 6 illustrates lock arm 18 and clamping mechanism 16 in a post-impact locked position.

With further reference to FIGS. 2 and 3, outboard cam 20 includes a main body 60 and an insertion portion 62 and a post 64 extending therefrom. Insertion portion 62 is oriented within a receiving aperture 66 (FIG. 2) of lock arm 18 such that rotational movement of lock arm 18 imparts rotational movement on outboard cam 20. Main body 60 and insertion portion 62 include a bolt aperture 68 to receive rake bolt 38 therethrough. Post 64 is configured to selectively engage inboard cam 24, as described herein in more detail.

As illustrated in FIGS. 2 and 3, inboard cam 24 includes a main body 70, a translating projection 72, and a travel limiter portion 74. Main body 70 includes slots 48 and a slotted aperture 76 formed therein. Slotted aperture 76 is configured to receive rake bolt 38 therethrough and enables forward shuttling movement of rake bolt 38 during a crash or impact event due to the elongated shape of slotted aperture 76. Translating projection 72 is oriented within a channel or slot 78 (FIG. 3) formed in rake bracket 14, which enables inboard cam 24 to move in the raking direction 50, but prevents forward/aft movement of inboard cam 24. Travel limiter portion 74 includes an upper stop 80, a lower stop 82, and an intermediate stop or shoulder 84 disposed therebetween.

In the unlocked position (FIG. 4), cam post 64 is adjacent to lower stop 82 and prevented from further movement toward stop 82. In this position, cam post 64 is disposed radially outward of shoulder 84. As such, shoulder 84 prevents forward movement of outboard cam 20 (and other connected components) to facilitate preventing damage to shearable retaining features that hold clamp mechanism 16 in place during normal adjustment of steering column assembly 10.

When lock arm 18 is moved to the locked position (FIG. 5), cam post 64 travels along travel limiter 74 to contact upper stop 80, where post 64 is prevented from further movement toward stop 80. In this position, cam post 64 is also disposed radially outward of shoulder 84. Thus, during normal operation between the locked and unlocked positions, cam post 64 is rotated between stops 80 and 82 radially outward of shoulder 84.

In a crash or impact event, steering column assembly 10 transitions from the locked position (FIG. 5) to the post-impact locked position (FIG. 6). During the impact event, steering column 12 collapses forward, which causes forward shuttling in the direction of arrow 100, of rake bolt 38, lock arm 18, outboard cam 20, and locking tooth 26. The forward shuttling causes teeth 36 of locking tooth 26 to engage teeth 34 of rake lock tooth wall 30. As shown in FIG. 6, cam post 64 is shifted or shuttled toward inboard cam slotted aperture 76 such that cam post 64 is now disposed between upper stop 80 and shoulder 84. As such, shoulder 84 prevents downward movement of cam post 64 toward lower stop 82, which facilitates preventing movement of lock arm 18 to the unlocked position.

Figure 7:
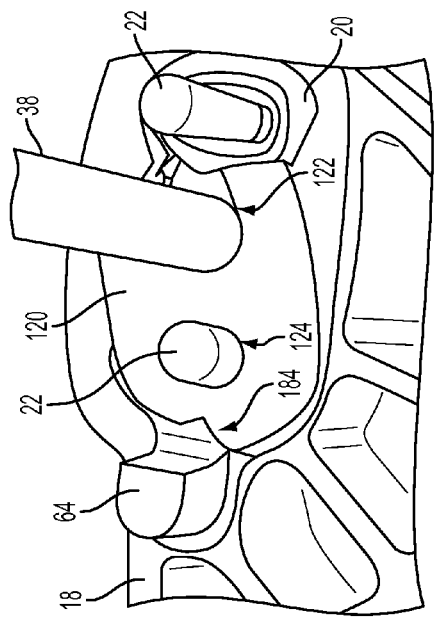
FIG. 7 is a perspective view of another clamping mechanism in an unlocked position.
Figure 9:
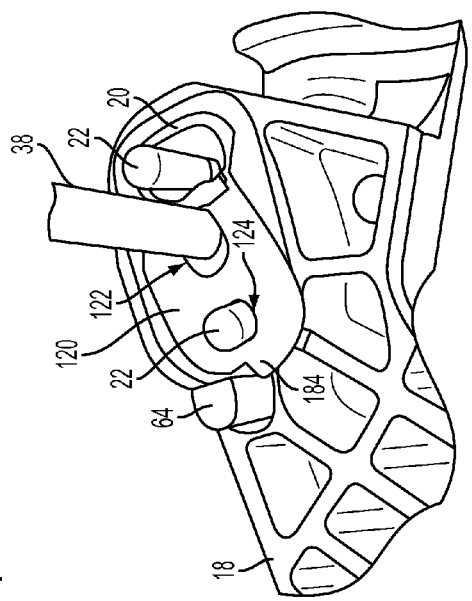
FIG. 9 is a perspective view of the clamping mechanism shown in FIG. 7 in a post-impact event position.
Figure 8:
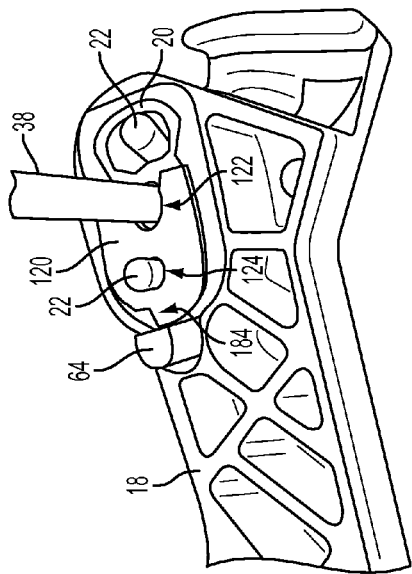
FIG. 8 is a perspective view of the clamping mechanism shown in FIG. 7 in a locked position.

FIGS. 7-9 illustrate an alternate clamping mechanism 116 that may be used with steering column assembly 10 when inboard cam 24 does not include an integral intermediate stop or shoulder 84 to prevent downward movement of cam post 64 after a crash or impact event. In the illustrated embodiment, clamping mechanism 116 includes a plate member 120 generally having a bolt slot 122, a pin aperture 124, and an intermediate stop or shoulder 184. Clamping mechanism 116 is disposed between outboard cam 20 and inboard cam 24 and operates in a manner similar to clamping mechanism 16, except that plate member shoulder 184 provides structure and function similar to shoulder 84 in the embodiment shown in FIGS. 4-6.

FIG. 7 illustrates clamping mechanism 116 and plate member 120 in an unlocked position. In this position, cam post 64 is disposed radially outward of shoulder 184, which prevents forward movement of outboard cam 20 (and other connected components) to facilitate preventing damage to shearable retaining features that hold clamp mechanism 116 in place during normal adjustment of steering column assembly.

When lock arm 18 is moved to the locked position (FIG. 8), cam post 64 is disposed radially outward of shoulder 184. Thus, during normal operation between the locked and unlocked positions, cam post 64 is rotated between stops 80 and 82 (not shown in FIGS. 7-9) radially outward of shoulder 184.

In a crash or impact event, steering column assembly 10 transitions from the locked position (FIG. 8) to the post-impact locked position (FIG. 9). During the impact event, steering column 12 collapses forward, which causes forward shuttling of rake bolt 38 and outboard cam 20. Bolt slot 122 allows shuttling of rake bolt 38, but pin 22 extending through pin aperture 124 prevents or reduces shuttling movement of plate member 120. As such, cam post 64 is shifted or shuttled toward inboard cam slotted aperture 76 such that cam post 64 is now disposed between upper stop 80 and shoulder 184. In this position, shoulder 184 prevents downward movement of cam post 64 toward lower stop 82, which facilitates preventing movement of lock arm 18 to the unlocked position.

Described herein are systems and methods that facilitate preventing unlocking motion of a clamp mechanism during or after a crash event. The clamp mechanism includes an outboard cam having a cam post that translates within a travel limiter of an associated inboard cam. The travel limiter includes opposed travel stops that enable the cam post to move between a locked and unlocked position. A projecting shoulder is disposed in a portion of the space between the travel stops. In normal operation between the locked and unlocked positions, the shoulder does not interfere with movement of the cam post. However, during a crash event, the cam post is shuttled forward into an area between one travel stop and the shoulder, which subsequently prevents movement of the cam post into the unlocked position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A clamping mechanism for a steering column assembly, the clamping mechanism comprising:
   an outboard cam configured to rotate about an axis between a first position and a second position;
   an inboard cam having a travel limiter portion configured to limit rotation of the outboard cam about the axis between the first position and the second position; and
   an intermediate stop disposed along a portion of the travel limiter portion,
   at least a portion of the outboard cam being shifted to a position adjacent the intermediate stop during an impact event of the steering column assembly, the intermediate stop preventing movement of the outboard cam from the first position to the second position.

2. The clamping mechanism of claim 1, wherein the first position is a locked position that facilitates preventing raking movement of the steering column assembly, and the second position is an unlocked position that facilitates raking movement of the steering column assembly.

3. The clamping mechanism of claim 1, wherein the outboard cam includes a main body and a post extending therefrom, the post operatively associated with the travel limiter portion to limit the rotation of the outboard cam about the axis.

4. The clamping mechanism of claim 3, wherein the travel limiter portion includes a first travel stop and an opposed second travel stop, the first travel stop configured to engage the post to stop rotation of the outboard cam in the first position, and the second travel stop configured to engage the post to stop rotation of the outboard cam in the second position.

5. The clamping mechanism of claim 4, wherein the intermediate stop is disposed adjacent the second travel stop between the first and second travel stops.

6. The clamping mechanism of claim 5, further comprising a plate member disposed between the inboard cam and the outboard cam, the plate member including the intermediate stop.

7. The clamping mechanism of claim 1, further comprising a rake bolt extending through the outboard cam and the inboard cam, the rake bolt configured to rotate about the axis.

8. The clamping mechanism of claim 7, wherein the inboard cam includes a slotted aperture configured to facilitate forward shuttling of the rake bolt during the impact event.

9. The clamping mechanism of claim 8, further comprising a locking tooth, the rake bolt extending through the locking tooth, wherein during the forward shuttling of the rake bolt the locking tooth is forced into engagement with a rake bracket of the steering column assembly to facilitate preventing raking movement of the steering column assembly.

10. The clamping mechanism of claim 1, further comprising a pin extending between the inboard cam and the outboard cam, a first portion of the pin extending into the inboard cam and an opposite second portion of the pin extending into the outboard cam.

11. A steering column assembly comprising:
    a steering column;
    a rake bracket coupled to the steering column; and
    a clamping mechanism configured to selectively enable raking movement of the steering column relative to the rake bracket, the clamping mechanism comprising:
      an outboard cam configured to rotate about an axis between a first position and a second position;
      an inboard cam having a travel limiter portion configured to limit rotation of the outboard cam about the axis between the first position and the second position; and
      an intermediate stop disposed along a portion of the travel limiter portion,
      at least a portion of the outboard cam being shifted to a position adjacent the intermediate stop during an impact event of the steering column assembly, the intermediate stop preventing movement of the outboard cam from the first position to the second position.

12. The assembly of claim 11, wherein the first position is a locked position that facilitates preventing raking movement of the steering column, and the second position is an unlocked position that facilitates raking movement of the steering column.

13. The assembly of claim 11, wherein the outboard cam includes a main body and a post extending therefrom, the post operatively associated with the travel limiter portion to limit the rotation of the outboard cam about the axis.

14. The assembly of claim 13, wherein the travel limiter portion includes a first travel stop and an opposed second travel stop, the first travel stop configured to engage the post to stop rotation of the outboard cam in the first position, and the second travel stop configured to engage the post to stop rotation of the outboard cam in the second position.

15. The assembly of claim 14, including a plate member disposed between the inboard cam and the outboard cam, the plate member including the intermediate stop being disposed adjacent the second travel stop between the first and second travel stops.

16. The assembly of claim 11, further comprising a lever arm coupled to the outboard cam.

17. The assembly of claim 11, further comprising a rake bolt extending through the outboard cam and the inboard cam, the rake bolt configured to rotate about the axis.

18. The assembly of claim 17, wherein the inboard cam includes a slotted aperture configured to facilitate forward shuttling of the rake bolt during the impact event.

19. The assembly of claim 18, further comprising a locking tooth, the rake bolt extending through the locking tooth, wherein during the forward shuttling of the rake bolt the locking tooth is forced into engagement with the rake bracket to facilitate preventing raking movement of the steering column.

20. The assembly of claim 11, further comprising a pin extending between the inboard cam and the outboard cam, a first portion of the pin extending into the inboard cam and an opposite second portion of the pin extending into the outboard cam.

* * * * *